(12) United States Patent
De Laet et al.

(10) Patent No.: US 11,092,230 B2
(45) Date of Patent: Aug. 17, 2021

(54) OIL DISTRIBUTOR

(71) Applicants: ZF Friedrichshafen AG, Friedrichshafen (DE); ZF Wind Power Antwerpen N.V., Lommel (BE)

(72) Inventors: Wim De Laet, Antwerp (BE); Bart Geudens, Retie (BE); Pieter-Jan Francis, Geetbets (BE)

(73) Assignees: ZF Friedrichshafen AG, Friedrichshafen (DE); ZF Wind Power Antwerpen N.V., Lommel (BE)

( * ) Notice: Subject to any disclaimer, the term of this patent is extended or adjusted under 35 U.S.C. 154(b) by 0 days.

(21) Appl. No.: 16/651,359

(22) PCT Filed: Aug. 29, 2018

(86) PCT No.: PCT/EP2018/073204
§ 371 (c)(1),
(2) Date: Mar. 27, 2020

(87) PCT Pub. No.: WO2019/063234
PCT Pub. Date: Apr. 4, 2019

(65) Prior Publication Data
US 2020/0271214 A1   Aug. 27, 2020

(30) Foreign Application Priority Data
Sep. 29, 2017 (DE) .................. 10 2017 217 377.7

(51) Int. Cl.
*F16H 57/04* (2010.01)
*F16H 57/031* (2012.01)

(52) U.S. Cl.
CPC ....... *F16H 57/0424* (2013.01); *F16H 57/031* (2013.01); *F16H 57/0423* (2013.01)

(58) Field of Classification Search
CPC . F16H 57/0424; F16H 57/031; F16H 57/0423
See application file for complete search history.

(56) References Cited

U.S. PATENT DOCUMENTS

| | | | |
|---|---|---|---|
| 2,608,272 A | 8/1952 | Rich | |
| 4,126,058 A | 11/1978 | Shelby et al. | |
| 2006/0049084 A1 | 3/2006 | Suzuki et al. | |
| 2014/0106922 A1* | 4/2014 | Hancox | F02C 7/36 475/159 |

FOREIGN PATENT DOCUMENTS

| | | |
|---|---|---|
| DE | 102007020453 A1 | 11/2008 |
| DE | 102009030751 A1 | 2/2011 |

* cited by examiner

*Primary Examiner* — Vicky A Johnson
(74) *Attorney, Agent, or Firm* — Leydig, Voit & Mayer, Ltd.

(57) ABSTRACT

An arrangement includes a first oil line, a second oil line, a third oil line, a cavity, and a plate having a continuous first hole and a continuous second hole. The first oil line, the second oil line and the third oil line each have a mouth in the cavity. The plate is arranged in the cavity in such a way that it covers the mouths of the second oil line and the third oil line. The first hole connects the second oil line and the cavity to each other in a fluid-conducting manner. The second hole connects the third oil line and the cavity to each other in a fluid-conducting manner.

13 Claims, 1 Drawing Sheet

OIL DISTRIBUTOR

CROSS REFERENCE TO RELATED APPLICATIONS

This application is a U.S. National Stage Application under 35 U.S.C. § 371 of International Application No. PCT/EP2018/073204 filed on Aug. 29, 2018, and claims benefit to German Patent Application No. DE 10 2017 217 377.7 filed on Sep. 29, 2017. The International Application was published in German on Apr. 4, 2019 as WO 2019/063234 A1 under PCT Article 21(2).

FIELD

The invention relates to an arrangement having a first oil line, a second oil line, a third oil line, and a cavity, wherein the first oil line, the second oil line, and the third oil line each have a mouth in the cavity.

BACKGROUND

Solutions with diaphragms are known from the prior art for branching a line for supplying oil in a gearbox. In this case, an oil-supplying line branches into a plurality of supply lines. Diaphragms are embedded in the supply lines in order to achieve a defined distribution of the oil.

Oil lines in a gearbox housing are usually introduced through bores. With regard to the production costs, bores with the same diameter are to be sought. However, this entails the risk that the diaphragms will be incorrectly installed. Moreover, the manufacture and assembly of the diaphragms is associated with increased costs.

SUMMARY

In an embodiment, the present invention provides an arrangement, comprising a first oil line, a second oil line, a third oil line, a cavity, and a plate having a continuous first hole and a continuous second hole. The first oil line, the second oil line and the third oil line each have a mouth in the cavity. The plate is arranged in the cavity in such a way that it covers the mouths of the second oil line and the third oil line. The first hole connects the second oil line and the cavity to each other in a fluid-conducting manner. The second hole connects the third oil line and the cavity to each other in a fluid-conducting manner.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
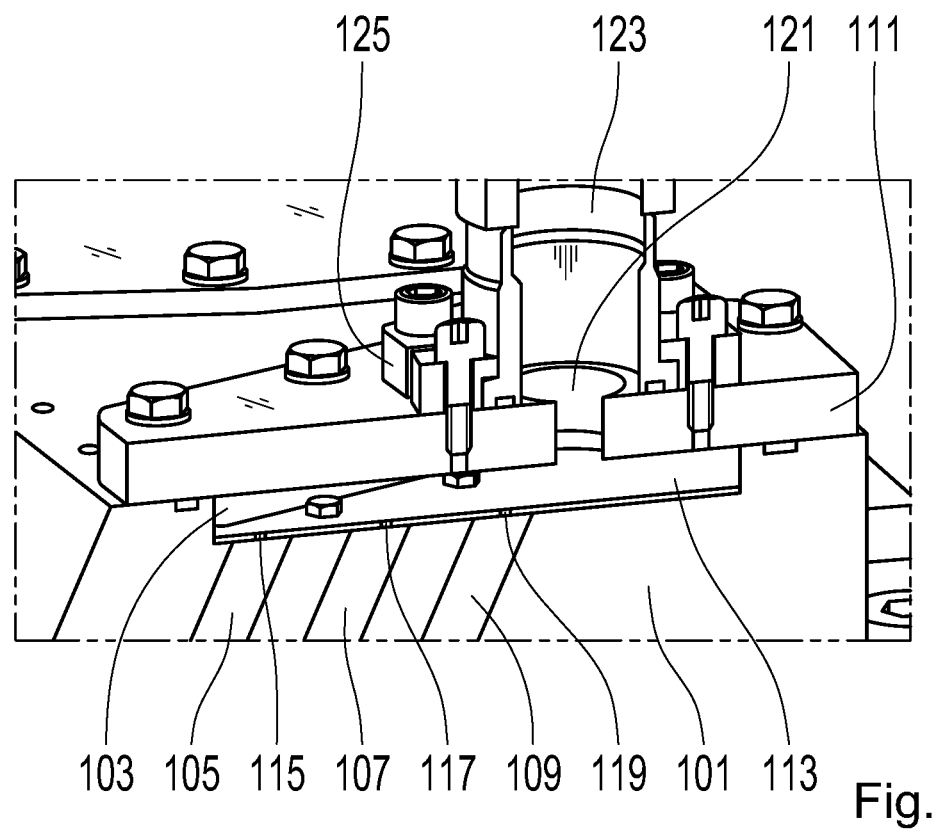
FIG. 1 shows a cross-section of an oil distributor.

Embodiments of the invention eliminate disadvantages inherent in solutions known from the prior art. In particular, embodiments of the invention reduce the risk of error during the assembly of oil lines and the costs.

According to the invention, an arrangement is provided that includes a first oil line, a second oil line, a third oil line and a cavity. An oil line can be understood as a device for conducting oil. Usually, an oil line is designed as a pipe or bore. A cavity can refer to a volume enclosed by one or more walls.

In the arrangement, the first oil line, the second oil line and the third oil line each open into the cavity, i.e. the first oil line, the second oil line and the third oil line each open into the cavity, i.e. each have a mouth in the cavity. As a result, the first oil line, the second oil line and the third oil line are all connected to the cavity in an oil-conducting manner.

A plate having a first hole and a second hole is provided according to the invention. The first hole and the second hole are continuous, i.e. they extend from one side of the plate to the opposite side. Both sides of the plate are thus each connected to conduct oil through the first hole and the second hole. The holes are, for instance, bores.

The mouths of the second oil line and the third oil line are covered by the plate. This implies that the plate is in the cavity.

In order to obtain the fluid-conducting connection between the mouth of the second oil line and the cavity and between the mouth of the third oil line and the cavity, the first hole and the second hole are arranged above the mouths. The first hole is located above the mouth of the second oil line. Accordingly, the third hole is located above the mouth of the third oil line. The first hole thus connects the second oil line and the cavity to each other in an oil-conducting manner. Accordingly, the second hole connects the third oil line and the cavity to each other in an oil-conducting manner.

The holes assume the function of the diaphragms mentioned at the outset. The use of a single plate instead of a plurality of diaphragms simplifies assembly. The risk of assembly errors is also reduced.

The arrangement is preferably developed with a component and a cover. The component has a recess. It is preferably designed as one piece. An edge of the recess preferably runs in one plane.

The cover covers the recess so as to form the above-described cavity. In particular, the cover covers the recess in an oil-tight manner Thus, no oil can escape from the cavity between the edge of the recess and the cover.

The second oil line and the third oil line open into the recess. The mouths of the second oil line and of the third oil line are therefore located in the recess, preferably at the bottom of the recess.

In a preferred development, the recess has at least one flat face. The face is preferably a base face of the recess, i.e. a face which forms the bottom of the recess. At its edges, the face merges into the side faces of the recess. The side faces in turn connect the edge of the recess to the base. The edge is formed by edges of the side faces.

According to a development, the second oil line and the third oil line open into the face. This means that the mouths of the oil line lie in the face and are each surrounded by the face. Furthermore, the plate is fixed to the face. For this purpose, the shape of the plate must correspond to the shape of the face. In particular, a flat plate is preferred.

In a further preferred development, the first oil line passes through the cover. This implies that the cover has a through-hole that connects the first oil line and the cavity to one another in an oil-conducting manner. As described above, the hole forms part of the first oil line.

In order to further lower the risk of assembly errors, the plate and the face are congruent in a preferred development. In particular, the plate can have a base face, a top face and at least one side face which connects the base face and the top face to one another. According to the development, the base face rests on the face of the recess. Its edges and the edges of the face of the recess run adjacent to each other. In particular, each edge at each point contacts a point of the other edge. Mouths of the first hole and the second hole are respectively located in the base face and in the top face of the plate. The base face and the top face are preferably congruent. This means that the two faces can be converted into one another by congruence mapping.

According to the development, the face of the recess and thus also the plate or its base face are not rotationally symmetrical. In this way, it can be ensured that the plate can be fixed in exactly one position on the face. Assembly errors are thereby impossible. In particular, the correct arrangement of the first hole and the second hole on the respective mouth of the second oil line and the third oil line can thus be ensured.

The arrangement is moreover preferably further developed with an oil circuit. The first oil line, the second oil line, the third oil line and the cavity are integrated into the oil circuit such that oil is introduced into the cavity from the first oil line. Since the cavity is connected in a fluid-conducting manner to the second oil line via the first hole and to the third oil line via the second hole, the oil consequently passes from the cavity into the second oil line and the third oil line. Thus, the oil is discharged from the cavity through the second oil line and the third oil line. The distribution of the oil to the second oil line and the third oil line is proportionate in accordance with the size of the first hole and the second hole.

The arrangement is particularly suitable for use in a gearbox, for example in a gearbox for a wind turbine. A housing of the gearbox forms the component described above. This implies that the housing has a recess that is covered by the cover. The second oil line and the third oil line are introduced into the housing, for instance in the form of bores. The first oil line is preferably designed as a tube and flanged onto the cover.

FIG. 1 shows a gearbox housing 101 in the wall of which a recess 103 is introduced. The wall of the gearbox housing 101 has a first bore 105, a second bore 107 and a third bore 109, each opening into the recess 103. A first plate 111 is screwed to the wall of the gearbox housing 101 and covers the recess 103. Thus, the first plate 111 and the recess 103 form a cavity.

A second plate 113 is arranged within the cavity formed by the recess 103 and the plate 111. This is screwed to the wall of the gearbox housing 101 at the bottom of the recess and covers the first bore 105, the second bore 107 and the third bore 109. The second plate 113 has a first hole 115, a second hole 117 and a third hole 119. The holes 115, 117, 119 are each designed continuous.

The first hole 115 connects the cavity and the first bore 105 to each other in a fluid-conducting manner; the second hole 117 connects the cavity and the second bore 107 to each other in a fluid-conducting manner; and the third hole 119 connects the cavity and the third bore 109 to each other in a fluid-conducting manner.

The first plate 111 has a fourth hole 121. This is also designed continuous.

To introduce oil into the cavity, a tube 123 is provided. The tube 123 is fixed to the first plate 111 such that a mouth of the tube 123 covers the fourth hole 121. Thus, the tube opens into the fourth hole 121.

A ring 125 fixes the tube 123 in a keyed fit. The ring 125 in turn is screwed to the first plate 111. In order to be able to better install the ring 125, it is of two-piece design.

Figure 2:
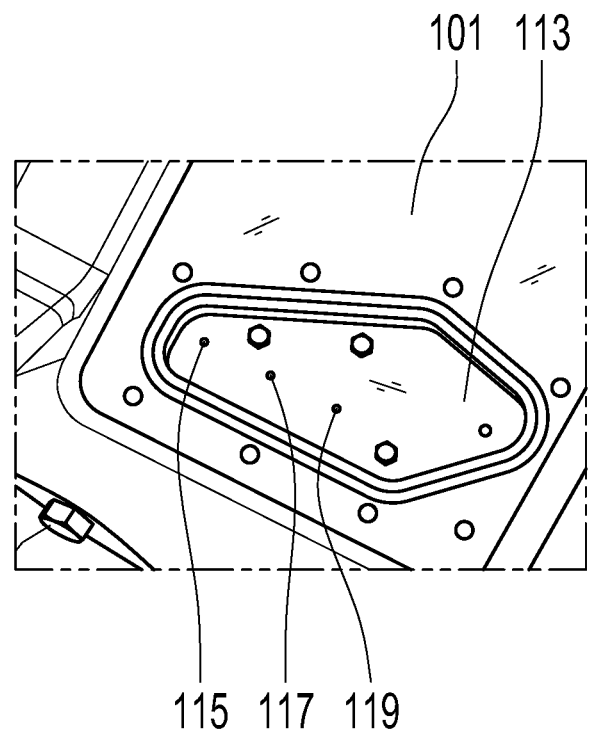
FIG. 2 shows the oil distributor in the open state.

FIG. 2 shows the gearbox housing 101 without the first plate 111 and the tube 123. The second plate 113 can be seen at the bottom of the recess 103. A groove extends along an edge of the recess 103 into which a seal can be inserted. The plate 113 is encircled by the side faces of the recess 103. In this way, the position of the second plate 113 within the recess 103 is clearly established.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

101 Gearbox housing
103 Recess
105 First bore
107 Second bore
109 Third bore
111 First plate
113 Second plate
115 First hole
117 Second hole
119 Third hole
121 Fourth hole
123 Tube
125 Ring

The invention claimed is:
1. An arrangement, comprising:
a first oil line;
a second oil line;
a third oil line;
a cavity; and
a plate having a continuous first hole and a continuous second hole, wherein the first oil line, the second oil line and the third oil line each have a mouth in the cavity, wherein the plate is arranged in the cavity in such a way that it covers the mouths of the second oil line and the third oil line;

wherein the first hole connects the second oil line and the cavity to each other in a fluid-conducting manner; and wherein the second hole connects the third oil line and the cavity to each other in a fluid-conducting manner.

2. The arrangement according to claim 1, wherein the cavity is formed by a component having a recess and by a cover that covers the recess, and wherein the mouths of the second oil line and the third oil line lie in the recess.

3. A gearbox with the arrangement according to claim 2, wherein a housing of the gearbox forms the component.

4. The arrangement according to claim 2, wherein the recess has a flat face, wherein the mouths of the second oil line and the third oil line lie in the flat face; and wherein the plate is fixed to a surface.

5. The arrangement according to claim 4, wherein the plate and the face are congruent, and wherein the flat face is not rotationally symmetrical.

6. The arrangement according to claim 2, wherein the first oil line passes through the cover.

7. The arrangement according to claim 1, further comprising:

an oil circuit;

wherein the first oil line, the second oil line, the third oil line and the cavity are integrated into the oil circuit such that oil is configured to be introduced into the cavity through the first oil line and discharged from the cavity through the second oil line and the third oil line.

8. The arrangement according to claim 1, wherein the plate is flat.

9. The arrangement according to claim 1, wherein the plate does not cover the mouth of the first oil line.

10. The arrangement according to claim 1, wherein the cavity is formed by a recess in a housing of the arrangement that is covered by a cover.

11. The arrangement according to claim 10, wherein the recess has a flat face, wherein the mouths of the second oil line and the third oil line lie in the flat face, and wherein the plate is flat and is disposed on the flat face.

12. The arrangement according to claim 10, wherein the first oil line comprises a tube connected to a continuous hole in the cover in a fluid-conducting manner, and wherein a mouth of the tube covers the continuous hole in the cover.

13. The arrangement according to claim 10, wherein the cover is flat.

* * * * *